US011302127B2

(12) United States Patent
Lee et al.

(10) Patent No.: US 11,302,127 B2
(45) Date of Patent: Apr. 12, 2022

(54) JOB SITE SECURITY SYSTEM AND METHOD OF USE THEREFOR

(71) Applicant: MILWAUKEE ELECTRIC TOOL CORPORATION, Brookfield, WI (US)

(72) Inventors: Hei Man Raymond Lee, Kwai Chung (CN); Ngai Cheung, Kwai Chung (CN)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

(21) Appl. No.: 16/964,370

(22) PCT Filed: Jan. 26, 2018

(86) PCT No.: PCT/CN2018/074354
§ 371 (c)(1),
(2) Date: Jul. 23, 2020

(87) PCT Pub. No.: WO2019/144385
PCT Pub. Date: Aug. 1, 2019

(65) Prior Publication Data
US 2021/0035392 A1    Feb. 4, 2021

(51) Int. Cl.
*G07C 9/00* (2020.01)
*H04W 84/18* (2009.01)

(52) U.S. Cl.
CPC ..... *G07C 9/00896* (2013.01); *G07C 9/00571* (2013.01); *G07C 2009/00769* (2013.01); *H04W 84/18* (2013.01)

(58) Field of Classification Search
CPC .................................................. G07C 9/00
See application file for complete search history.

(56) References Cited

U.S. PATENT DOCUMENTS

| 6,756,704 | B2 | 6/2004 | Milojicic et al. |
| 9,886,806 | B2 * | 2/2018 | Bashkin ................. A47B 57/04 |
| 10,631,120 | B2 * | 4/2020 | Burch ................... G06Q 10/06 |
| 10,719,806 | B1 * | 7/2020 | Riemenschneider ....................... G06Q 20/40145 |
| 2016/0247343 | A1 | 8/2016 | Pailleret |

FOREIGN PATENT DOCUMENTS

| CN | 101071309 A | 11/2007 |
| CN | 104850774 A | 8/2015 |
| CN | 205728540 U | 11/2016 |

OTHER PUBLICATIONS

International Search Report and Written Opinion for Application No. PCT/CN2018/074354 dated Oct. 23, 2018 (6 pages).

\* cited by examiner

*Primary Examiner* — K. Wong
(74) *Attorney, Agent, or Firm* — Michael Best & Friedrich LLP

(57) ABSTRACT

A job site security system contains a wireless communications node and a device such as a tool, a battery, a charger, etc., which contains a controller. Each tool has a locked state and an unlocked state as determined by the controller. Each tool is (initially) in the locked state. When the wireless communications node transmits a signal to the device the controller changes the locked state to the unlocked state allowing the device to be used. A method for securing a job site is also provided.

17 Claims, 4 Drawing Sheets

JOB SITE SECURITY SYSTEM AND METHOD OF USE THEREFOR

CROSS-REFERENCE TO RELATED APPLICATIONS

This application is a national phase filing under 35 U.S.C. § 371 of International Application No. PCT/CN2018/074354, filed Jan. 26, 2018, the entire content of which is incorporated herein by reference.

FIELD OF THE INVENTION

The present invention relates to the field of power tools. More specifically, the present invention relates to the field of power tool security.

BACKGROUND

At a construction site, job site, etc. (hereinafter, "site"), there are typically tens or even hundreds of tools to keep track of. This is complicated by the fact that many workers will bring their own tools as well as use those present at the site, and/or provided by the employer. Furthermore, these tools, especially the power tools, may be expensive and/or specialized for a specific purpose and/or use. Workers may, either inadvertently or on purpose, take a tool from the site. In some cases this may be by accident, as when a site's tool is confused with a personal tool, and in other cases this may be on purpose, as some of these tools may be very expensive. In the past, the access to these tools was typically handled by limiting physical access to the tools with a lockable tool shed, tool box, collecting the tools every night and locking them away for the next day, etc. However, with such a system, once the tools were either taken away for (authorized) use or checked-out by an individual, they were out of the control of the tool owner/manager. The current physical methods of locking each tool up and requiring specific authorization to use a tool tend to be cumbersome and difficult to enforce in a busy site which may have many employees, contractors, and sub-contractors present at any given time.

In other cases, an entity, such as the foreman of the site, the owner of the site, the owner of the construction company, etc., may wish to limit use and/or the authorization to use various tools at the site, and/or limit the use of specific tools to specific people and/or specific jobs. However, in previous systems which merely limit physical access to the tool(s), there is little ability to control use by unauthorized people and/or to limit the use to specific locations.

In addition, it may be desirable to be able to track the tool usage, and/or to compile data about the tool usage. It may also be desirable to be able to track the location of the tools so as to be able to reduce loss and theft.

Accordingly, the need exists for an improved tool management and security system which reduces tool theft and unintentional misappropriation. There also exists a need to track and/or to compile data regarding tools and their usage. The need also exists for limiting the use of tools to specific people, specific locations, and/or specific uses.

SUMMARY OF THE INVENTION

An embodiment of the present invention relates to a job site security system having a wireless communication node having a wireless transmitter, and a plurality of tools. Each tool has a controller operatively-connected to a wireless receiver. Each tool has a locked state and an unlocked state as determined by the controller. Each tool is (initially) in the locked state. When the wireless transmitter transmits a wireless signal and the wireless receiver receives the wireless signal, the controller unlocks the tool, typically by changing the locked state to the unlocked state.

Another embodiment of the present invention relates to a method for securing a job site having the steps of providing a wireless communication node and providing a plurality of tools. Each tool has a controller operatively-connected to a wireless receiver. Each tool has a locked state and an unlocked state as determined by the controller. Each tool is (initially) in the unlocked state. The method also contains the steps of transmitting an unlocking signal from the wireless transmitter, receiving the unlocking signal with the wireless receiver, and unlocking the tool with the controller.

Another embodiment of the present invention relates to a job site security system having a wireless communication node comprising a wireless transceiver and a plurality of devices. Each device is independently selected from the group of a tool, a battery, a charger, and a combination thereof. Each device has a controller operatively-connected to a wireless transceiver, and each device has a locked state and an unlocked state as determined by the controller. The device is (initially) in the locked state. When the wireless communication node's wireless transceiver transmits a wireless signal, and when the device's wireless transceiver receives the wireless signal, the controller unlocks the tool.

Without intending to be limited by theory it is believed that such a job site security system and a method for using such a system may reduce or prevent loss of a device; or a tool, a charger, and/or a battery, due to inadvertent or purposeful removal from the site. For example, if a device; or a tool, a charger, and/or a battery, is inadvertently removed from the site and the user finds that it cannot be used outside the site, then they may bring it back. Alternatively, if a person is potentially interested in removing a device; or a tool, a charger, and/or a battery, from the job site without permission, there will be little incentive to steal it if he/she knows that it cannot be used elsewhere. In addition, it is believed that the present job site security system may be able to track and/or to compile data regarding a device; or a tool, a charger, and/or a battery, such as their location, their users, and/or their usage.

Figure 1:
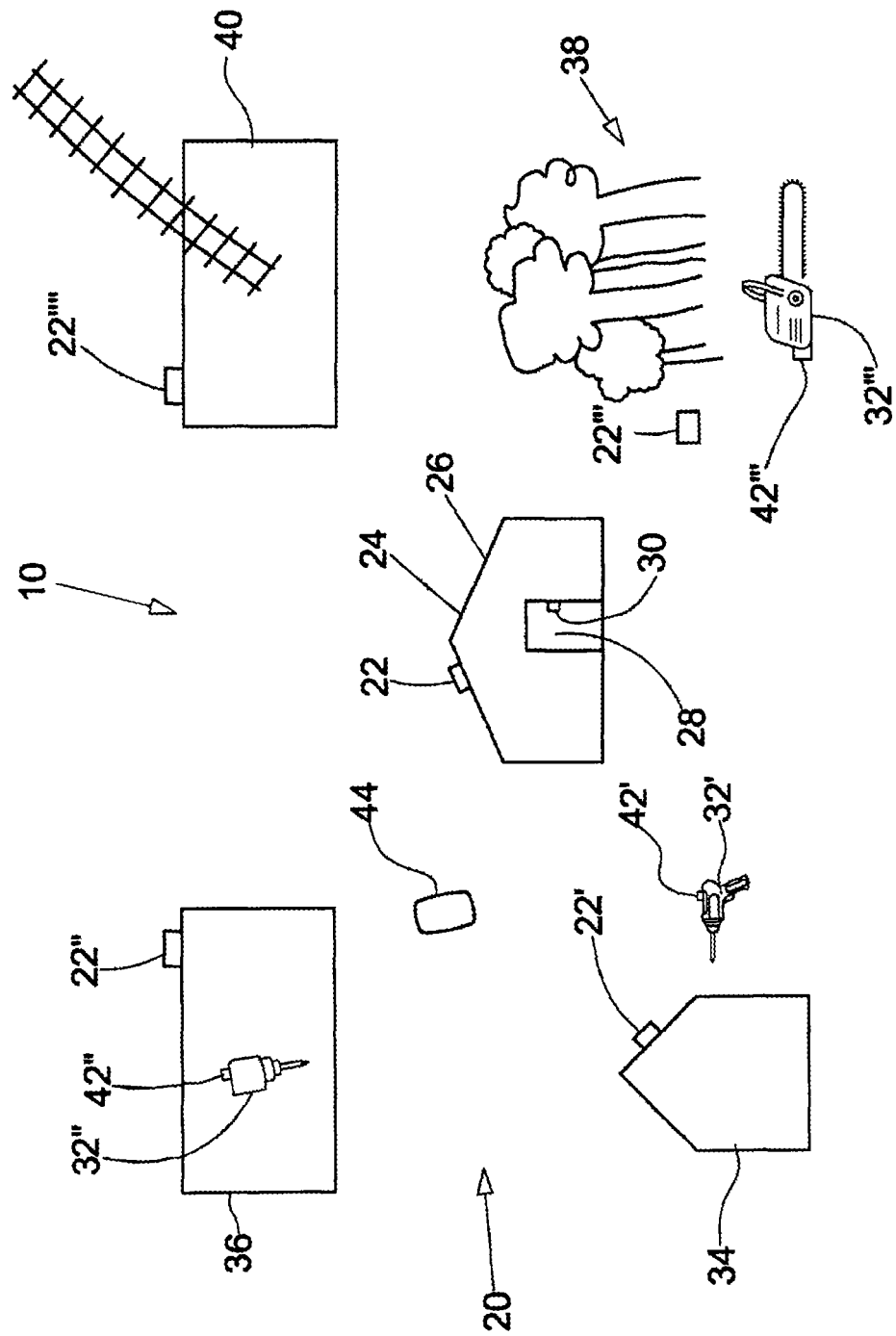
FIG. 1 shows a perspective view of an embodiment of a site containing the job site security system.

The figures herein are for illustrative purposes only and are not necessarily drawn to scale.

DESCRIPTION OF THE PREFERRED EMBODIMENTS

Unless otherwise specifically provided, all measurements are made in metric units. Furthermore, all percentages, ratios, etc. herein are by weight, unless specifically indicated otherwise.

As used herein, the phrase "locked state" indicates a state wherein the tool may not be used as-is, such as when the controller is preventing the motor from operating, is inhibiting the electricity flow within the tool, etc.

As used herein, the phrase "unlocked state" indicates a state wherein the tool may be used as-is.

An embodiment of the present invention relates to a job site security system including a wireless communication node and a plurality of tools. The wireless communication node contains a wireless transmitter while each of the plurality of tools includes a controller operatively-connected to a wireless receiver. Each tool has a locked state and an unlocked state as determined by the controller. The tool is (initially) in the locked state. When the wireless transmitter transmits a wireless signal; or an unlocking signal, and the wireless receiver receives the wireless signal; or unlocking signal, then the controller unlocks the tool by changing the locked state into the unlocked state. In an embodiment herein, the controller may also lock the tool upon receipt of the wireless signal; or a locking signal.

An embodiment of the present invention relates to a job site security system including a wireless communication node and a plurality of devices. In an embodiment herein, each device is independently selected from the group consisting of a tool, a battery, a charger, and a combination thereof. The wireless communication node contains a wireless transceiver while each of the plurality of devices independently-includes a controller operatively-connected to a wireless transceiver. Each device independently has a locked state and an unlocked state as determined by the controller. The device is (initially) in the locked state. When the wireless communication node's wireless transceiver transmits a wireless signal; or an unlocking signal, and the device's wireless transceiver receives the wireless signal; or unlocking signal, then the controller unlocks the device by changing the locked state into the unlocked state. In an embodiment herein, the controller may also lock the device upon receipt of the wireless signal; or a locking signal. Without intending to be limited by theory it is believed that such a system and a method for using such a system may reduce or prevent loss of a device; or a tool, a charger, and/or a battery, due to inadvertent or purposeful removal from the site. For example, if a device; or a tool, a charger, and/or a battery, is inadvertently removed from the site and the user finds that it cannot be used outside the site, then they may bring it back. Alternatively, if a person is potentially interested in stealing a device; or a tool, a charger, and/or a battery, then if he/she knows that it cannot be used when taken away from the site, then they will have little incentive to steal it. In addition, it is believed that the present job site security system may be able to track and/or to compile data regarding a device; or a tool, a charger, and/or a battery, such as their location, their users, and/or their usage.

The wireless communication node may be powerful enough to cover the entire construction site, or may be operatively-connected to one or more other wireless communication nodes. In an embodiment herein. The jobsite security system herein, contains a plurality of wireless communication nodes; or from about 1 to about 32768 wireless communication nodes; or from about 1 to about 10000 wireless communication nodes; or from about 1 to about 1000 wireless communication nodes; or from about 1 to about 20 wireless communication nodes; or from about 2 to about 15 wireless communication nodes.

The wireless communication node may transmit a wireless signal (see FIG. 2 at 62); or a variety of wireless signals, such as, but not limited to, an unlocking signal, a locking signal, another signal, and a combination thereof. More specifically, the wireless communications node may transmit an unlocking signal.

The communications node herein employs a wireless communication protocol selected from the group of near field communication (NFC), a proximity card, radio frequency identification (RFID), infrared, audio, visual, Wi-Fi, Bluetooth™, ZigBee™, 3G, 4G, 5G, 6G, NB-IOT, LTE, CDMA, and/or other wireless communication systems and/or protocols as desired, and a combination thereof; or Bluetooth™, Wi-Fi, and a combination thereof. Such wireless standards and protocols are widely-available worldwide and are well-known in the wireless communications art.

In an embodiment herein, the wireless communications node and the wireless receiver; or wireless transceiver(s) employ a security protocol to protect the signal(s), the wireless communication node, the wireless receiver, the wireless transmitter, the wireless transceiver, and/or the tool, etc. In an example herein, the security protocol is RTD 2.0. In an embodiment herein, the security protocol uses encryption.

In an embodiment herein, the wireless communication node, the wireless receiver, the wireless transmitter, and/or the wireless transceiver is substantially sealed; or sealed, from the environment and is, for example, water-proof, oil-proof, and/or weather-proof.

Figure 2:
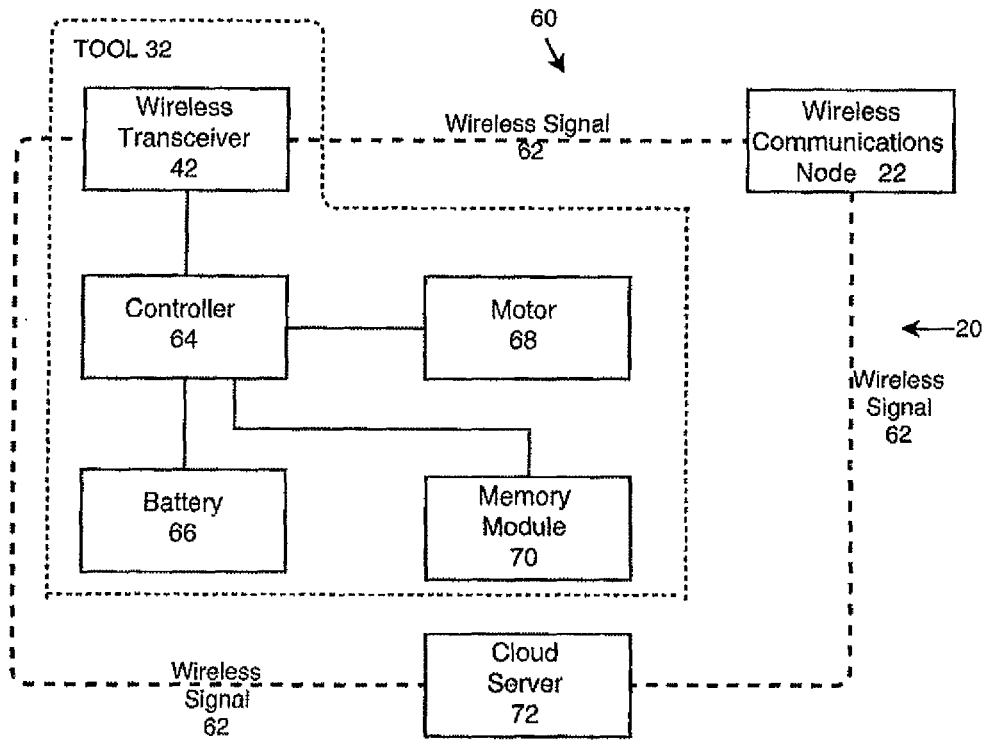
FIG. 2 shows a schematic circuit diagram of an embodiment of the jobsite security system.

In an embodiment herein, the wireless communication node contains a transceiver, which is capable of both transmitting and receiving a wireless signal (see FIG. 2 at 62). In an embodiment herein, the tool contains a transceiver, which is capable of both transmitting and receiving a wireless signal (see FIG. 2 at 62). In an embodiment herein, the tool contains a transceiver, the wireless communication node contains a transceiver, and the tool sends a wireless signal to the wireless communications node, and the wireless communications node receives the wireless signal.

In an embodiment herein, the job site security system contains a mesh network; or a mesh network formed by the wireless communication node(s) and the tools; or a mesh network formed by the transceivers in the wireless communication node(s) and the transceivers in the tools. In an embodiment herein, the mesh network is selected from the group of a Bluetooth™ mesh network, a Wi-Fi mesh network, a cellular network, and a combination thereof.

In an embodiment herein, a wireless communication node; or each wireless communication node; corresponds to a specific location at the site, thereby becoming a location-specific wireless communication node. In an embodiment herein, the system herein contains a plurality of location-specific wireless communication nodes. A tool from the plurality of tools may be assigned to only work in a specific operable location. For example, a jackhammer may only be assigned for use in an area which requires the breaking up of existing concrete. A wireless communication node may then correspond to each operable location, such as defining the area of the existing concrete. The tool may then be unlocked only when in wireless communication with the wireless communication node corresponding to the operable location for the tool, for example, the jackhammer only works when in the location of the existing concrete, as defined by the respective wireless communication node. Without intending to be limited by theory, it is believed that such a system would allow the site manager, foreman, owner, etc. to reduce or prevent the misuse of tools or damage thereof due to improper use. For example, a concrete saw and blade will be irrevocably-damaged when used to cut a railroad tie, but the actual worker using the saw may not be concerned with this because he/she just wants to cut the railroad tie as quickly and easily as possible. A location-specific wireless communication node designating a concrete-containing area (which does not contain any railroad ties) and a corresponding concrete saw designated only for use in concrete-containing areas (as defined by the above location-specific wireless communication node) would prevent misuse of the concrete saw to cut railroad ties in another location, and thereby prevent damage to the concrete saw and/or the saw blade.

In an embodiment herein, the wireless communications node transmits a signal, such as the unlocking signal, the locking signal, or another signal, to the wireless receiver indirectly, such as, for example, by sending a signal, such as the unlocking signal, the locking signal, or another signal, to a cloud server, and the cloud server sends a signal, such as the unlocking signal, the locking signal, or another signal, to the wireless receiver.

In an embodiment herein, each individual tool in the plurality of tools is a powered tool, such as an electric, gasoline, or hybrid tool. The electric and/or hybrid tools may run on DC and/or AC current. Furthermore, in an embodiment herein, each individual tool in the plurality of tools is selected from the group of a spray device, a garden care device, a power tool, a vacuuming device, a cutting device, an applicator, a heating device, a lighting device, a sound device, a motor, a generator, and a combination thereof. In an embodiment herein, the spray device is selected from the group consisting off a paint sprayer, a water sprayer, an insecticide sprayer, a fertilizer sprayer, a power sprayer, a high pressure sprayer, and a combination thereof. In an embodiment herein, the garden care device herein is selected from the group consisting of a mowing device, a blowing device, a trimming device, and a combination thereof; or a lawn mower, a leaf blower, a grass trimmer, a tree trimmer, a hedge trimmer, an edger, a mulcher, and a combination thereof. In an embodiment herein, the power tool herein is selected form the group consisting of a sander, a finisher, a fastener, a cutting device, a drill, a grinder, a screwdriver, a jackhammer, a nail or fastener gun, a lathe, a pneumatic wrench, a pneumatic clamp, an expansion tool, a crimper, a polisher, a router, a pneumatic hammer, an impact hammer, a knockout tool, a coring tool, and a combination thereof. In an embodiment herein, the vacuuming device is selected from the group consisting of a wet vacuum, a dry vacuum, a hand vacuum, a mulcher/vacuum, and a combination thereof. In an embodiment herein the cutting device is selected from the group consisting of a circular saw, a band saw, a chainsaw, a reciprocating saw, a table saw, a radial arm saw, a rotary saw, a miter saw, a concrete saw, an abrasive saw, a jig saw, a scroll saw, shears, a cutter, a cut out tool, a nibbler, a laser leveler, and a combination thereof. In an embodiment herein, the applicator is selected from the group consisting of a paint applicator, a glue applicator, a soldering iron, and a combination thereof. In an embodiment herein, the heating device is selected from the group consisting of a gas heater, an electric heater, and a combination thereof; or a space heater, a blow dryer, a fan heater, and a combination thereof. In an embodiment herein, the lighting device is selected form the group consisting of a cordless light, a LED light and a combination thereof; or is selected from the group consisting of a hand held light, a spotlight, an area light, a flood light, a tower light, a helmet light, a belt light, a harness light, a room light, and a combination thereof. In an embodiment herein, the sound device is selected from the group consisting of a megaphone, a microphone, a speaker, a radio, a cell phone, a walkie-talkie, a smart watch, a mobile device, and a combination thereof. In an embodiment herein, the motor is selected from the group consisting of a generator, a winch, a hoist, and a combination thereof. In an embodiment herein, the generator is an electric generator which is powered by, for example, gasoline, diesel, kerosene, light, propane, butane, and a combination thereof. The generator herein may be an AC generator, a DC generator, an inverter generator, and/or a hybrid generator as desired.

The battery useful herein may be a rechargeable battery; or a smart battery. In an embodiment herein, the battery contains a controller.

The charger useful herein may be a charger for a rechargeable battery, or a smart charger. The charger may be, for example, a DC charger, an AC charger, an inverter charger, etc. as desired. In an embodiment herein, the charger contains a controller.

The controller useful herein is typically a printed circuit board, a microprocessor, a computer and/or other electronic control mechanism as known in the art. The controller is operatively-connected to the wireless receiver; or the wireless transceiver in the tool, and when the wireless receiver; or the wireless transceiver, receives the unlocking signal, then the controller unlocks the tool by changing the locked state into the unlocked state. The tool may then be used by the operator. In an embodiment herein, the tool, battery, charger, mobile device, communication node, etc. may have a locked state and an unlocked state which is controlled by a controller.

In an embodiment herein, the tool, battery, charger, mobile device, communication node, etc. contains firmware; or upgradable firmware therein, typically in the controller or operatively-connected to the controller. In an embodiment herein, the locked state and the unlocked state are controlled by changing the firmware.

In an embodiment herein, the wireless communication node may send a firmware update to update the whole system, an individual tool, battery, charger, mobile device, communication node, etc., or any combination thereof.

In an embodiment herein, the wireless communication node, the wireless transmitter, the wireless receiver and/or the wireless transceiver communicates with a technology, standard, or protocol selected from the group of near field communication (NFC), proximity card, radio frequency identification (RFID), Wi-Fi, Bluetooth™, ZigBee™, 3G, 4G, 5G, 6G, LTE, and/or other wireless communication systems and/or protocols as desired, and a combination thereof; or Bluetooth™, NFC and a combination thereof. Such wireless technologies, standards and protocols are well-known in the wireless communications art.

In an embodiment herein, the wireless communication node may also transmit another signal to the wireless receiver, such as, for example, a firmware update for the tool, a firmware update for the battery, a firmware update for the communications node, a firmware update for the mobile device, a security patch, a request for information, an emergency notice, a control command, a dataset, and a combination thereof.

However, it is recognized that if the system and/or the controller unlocks the tool for an unlimited amount of time, then the value of the system to the site owner, tool owner, construction company, etc. is diminished. Accordingly, in an embodiment of the system and the method of the present invention, after a predetermined period of time has passed from the unlocking of the tool the controller changes; or automatically changes, the tool from the unlocked state to the locked state; or the controller initiates the locked state; or automatically initiates the locked state, of the tool within a predetermined period of time or from about 1 minute to about 24 hours; or from about 10 minutes to about 20 hours; or from about 15 minutes to about 15 hours; or from about 30 minutes to about 12 hours; or from about 1 hour to about 10 hours of receiving the unlocking signal; or of changing the locked state into the unlocked state thereby unlocking the tool.

In an embodiment herein, the user and/or owner sets the predetermined period of time; or the user and/or owner may set the predetermined period of time from about 10 minutes to about 6 months; or from about 30 minutes to about 3 months' or from about 1 hour to about 1 month. In an embodiment herein, the user and/or owner sets the predetermined period of time via, for example, the mobile device, the cloud, the internet, and/or, etc.

Without intending to be limited by theory, the inventors believe that this may help to ensure that the tool must remain at the site and/or within the range of the communications node in order to remain operable. If, for example, the user takes the tool outside of the communications node's range until it becomes locked (i.e., the controller initiates; or re-initiates, the locked state) and stops working, then in order to unlock the tool, the user must bring it back within range of the communications node, and receive a new unlocking signal therefrom so that the controller will change the locked state into the unlocked state, thereby unlocking the tool, again.

Without intending to be limited by theory it is believed that helps to ensure that the tool(s) remains locked when they are not located in the site, and/or within range of the communications node. This may also prevent unauthorized usage of the tool.

In an embodiment herein, the unlocking signal is specific to each particular tool in the plurality of tools.

In an embodiment herein, the wireless communication node transmits a locking signal to the wireless receiver. When the wireless receiver receives the locking signal, then the controller locks the tool.

In an embodiment herein, the wireless communication node is located within or is integral to a lockable storage unit within which the plurality of tools are stored. The lockable storage unit may be a large space, such as a room or a storage shed, or a small space, such as a tool box. In an embodiment herein, the wireless communication node is also be responsible for transmitting a locking signal and/or an unlocking signal for an electronic lock for the door or cover of the lockable storage unit as well.

In an embodiment herein, the lockable storage unit may be lined with a signal blocker, a radio frequency shield, and/or signal shield to block; or partially block; or reduce the strength of, the wireless signal. This can then be used to alert the user/owner as to whether or not all of the tools are located in the lockable storage unit, for example, at the end of the day. If the tool is not placed in the lockable storage unit by a certain time of each day, or at another time and/or after a certain period as defined by the user/owner, then an alarm may be triggered, either on the tool itself, or at another location such as at the lockable storage unit. The alarm may be an audible and/or visible alarm. Alternatively, a notification may be sent out to a mobile device, the cloud, etc. to notify the user and/or owner. By placing a wireless communications node inside of the lockable storage unit, the relative strength of the wireless signal can be gauged by, for example, the tool or the system itself. If the wireless signal strength is less than a preset threshold amount (typically set by the user/owner), then an alarm or other notification may be triggered.

For example, a lockable storage unit contains a Bluetooth™ communications node therein and is shielded such that when the tools are inside of the lockable storage unit, the Bluetooth™ signal strength is −30 dB, while outside of the lockable storage unit, the Bluetooth™ signal strength is −70 dB. The preset threshold amount may be, for example, −50 dB. When the lockable storage unit is locked, then the Bluetooth™ communications node checks the signal strength of the tools that are registered for storage at that lockable storage unit. If the signal strengths for each tool is sufficient so as to be above the preset threshold amount, (i.e., greater than −50 dB) then that indicates that all the tools are present, then either no action is needed, or perhaps a notification is sent to the user/owner indicating that tall tools are present and accounted for. However, if the signal strengths of the tools indicate that one or more tools are not located in the lockable storage unit, then an alarm and/or notification may be triggered. For example, an alarm may be triggered on the tool itself, and a notification may be sent to the user and/or the owner.

Turning to the Figures, FIG. 1 shows a perspective view of an embodiment of a site, 10, which in this case is a construction site, containing the job site security system, 20, herein. A plurality of wireless communication nodes, 22, are located at various points in the site, 10, and are designated as specific locations, thereby making them location-specific wireless communication nodes, 22', 22", 22'", 22"". The wireless communication nodes contain wireless transceivers (see FIG. 2 at 42), as they contain both a wireless transmitter and a wireless receiver.

A wireless communications node, 22, is located on a lockable storage unit, 24, which in this case is a lockable tool shed, 26. The lockable tool shed, 26, has a door, 28, which has an electronic lock, 30, that is controlled by the wireless communications node, 22. The site, 20, contains a plurality of tools, 32, which may be used around the site, 20, for different jobs. When not in use, and/or at night time, the plurality of tools may be physically stored in the lockable storage unit for safe keeping, recharging, etc. In an embodiment herein, the lockable storage unit further contains a tracking system for the plurality of tools, which keeps a data log of, for example, what tools are present on the site, who has used them, their status (new, used, old, worn, needs replacement, battery charge level, in-use, charging, requires maintenance, under maintenance, etc.), where they are located at any given moment (i.e. which wireless communications node(s) they are close to), etc. This tracking system may use one or more communication protocols and technologies described herein as well as, for example, GPS, QR-codes, bar codes, laser scanners, etc. to track the tools and their statuses.

In FIG. 1, a house, 34, is assigned the wireless communication node 22', while a demolition site, 36, is assigned the wireless communication node 22". Similarly, the nearby woods, 38, are assigned wireless communication node 22''', while the railroad terminus, 40, is assigned wireless communication node 22''''. Thus, when a wireless communication node is assigned to a specific location, this may also allow a tool may be assigned to an operable location coinciding with the wireless communication node in that specific location.

For example, a drill, 32', may be assigned to the operable location of the house, 34, by designating the drill, 32', to only be for use at the house, 34. This can be arranged by designating the drill, 32', to work only when receiving an unlocking signal from the wireless communication node, 22', located at the house, 34. Similarly, a jackhammer, 32'', may be assigned to the operable location of the demolition site, 36, by designating the jackhammer, 32'', to only be used at the demolition site, 36. This may be arranged by designating the jackhammer, 32'', to work only when receiving an unlocking signal from the wireless communication node, 22'', located at the demolition site, 36. Similarly a chainsaw, 32''', may be assigned an operable location by designating it only for use only in the woods, 38, by designating it to work only when receiving an unlocking signal from the wireless communication node, 22''', located in the woods, 28.

However, if they are removed from their respective operable locations, the drill, 32', and the chainsaw, 32''', to, for example, the railroad terminus, 40, then they would not be able to be used. This is because the controller (see FIG. 2 at 62), would not unlock either of the tools by placing them in the unlocked state, unless the drill, 32', and the chainsaw, 32''', respectively receive a wireless signal (see FIG. 2 at 62) which in this case may be an unlocking signal, from the communications node, 22', at the house, 34, or a wireless signal (see FIG. 2 at 62) which in this case may be an unlocking signal, from the communications node, 22''', at the woods, 38. Because they is not so designated by the site owner, foreman, company owner, etc., a wireless signal (see FIG. 2 at 62) which in this case may be an unlocking signal, from the communications node, 22'''', at the railroad terminus, 40, would not result in an unlocked drill or chainsaw.

Furthermore, it can be seen in FIG. 1 that each tool, 32, respectively contains a wireless transceiver, 42, which is operatively-connected to the wireless communications node, 22. The wireless receiver is operatively-connected to a controller (see FIG. 2 at 62), which controls whether the tool is in the locked state or the unlocked state.

In the embodiment of FIG. 1, an optional mobile device, 44, may be, for example, a tablet computer, a mobile phone, smart watch, or a combination thereof; or a smartphone, is present which is also operatively-connected to the wireless communications node, 22, either directly or via a cloud server (see FIG. 2 at 72). In some embodiments herein, the mobile device may contain the wireless communications node. In other embodiments, the mobile device may be external to the wireless communications node, and may operatively-connect to the wireless communications node.

The various wireless communication nodes, 22, 22', 22'', 22''', 22'''', the mobile device, 44, and the wireless transceivers, 42, in the tools, 32', 32'', 32''', all communicate together and form a mesh network; or a local mesh network. The mesh network may be a full mesh network or a partial mesh network, as desired, however, it is realized that a partial mesh network is likely the most practical mesh network in a dispersed site such as a construction site and with limited powered transceivers such as those in the tools.

In an embodiment herein, the tool; or the controller, checks for the presence of the wireless communication node on a periodic basis in order to continue in the unlocked state.

If the tool; or the controller, is not operatively-connected to the wireless communication node, then the controller may, for example, initiate the locked state, sound an alarm, issue an audible alert to the user, issue a visible alert to the user, and a combination thereof. In an embodiment herein, the periodic basis is a predetermined period of time; or from about 1 minute to about 24 hours; or from about 10 minutes to about 20 hours; or from about 15 minutes to about 15 hours; or from about 30 minutes to about 12 hours; or from about 1 hour to about 10 hours. In an embodiment herein, the user and/or the owner may set the predetermined period of time.

In an embodiment herein, the the controller locks the tool within a predetermined period of time from receiving the unlocking signal.

In an embodiment herein, the mobile device allows the user (presumably the site owner, the foreman, the company owner, the tool owner, etc.) to control and/or monitor at least one; or all, aspect(s) of the job site security system. For example, the mobile device may allow the user to designate particular tools for the location-specific wireless communication node(s), to directly, or indirectly transmit or instruct the wireless communication node to transmit one or more unlocking signals, one or more locking signals, one or more another signals, and a combination thereof. The mobile device herein may also allow the user, for example, to track the location of the tools, receive data about the tools from the data log, etc.

In an embodiment herein, at the end of the working period, the lockable storage unit sends a report to the mobile device detailing, for example, the presence (or lack thereof) of the plurality of tools, the wear status of the plurality of tools, the battery status of the plurality of tools, the repairs needed for the plurality of tools, any damage to the plurality of tools, and a combination thereof.

In an embodiment of the present invention, the job site security system, the tool; or each tool, keeps a user log of the user and correlates the user with the user's experiences and style of use. In an embodiment herein, the job site security system, the tool; or each tool, analyses the user's experiences and style so as to adjust the tool for that user; for example by adjusting the power levels, so as to accommodate the user's preferences. In an embodiment herein, the tool; or each tool uploads the user log to the wireless communications node; or automatically uploads the user log to the wireless communications node.

In an embodiment herein, the job site security system, the tool; or each tool, monitors tool data, such as, for example, the usage, status, battery levels, power drain rate, etc. of the tool, and makes proactive suggestions to a person such as the site owner, the foreman, the tool owner, etc. as to when to provide maintenance, replacement batteries, to replace tool parts, to order new batteries, to order replacement tool parts, etc.

Each of the wireless communications nodes, 22, may be operatively-connected to a power source, 46, which may be an AC and/or a DC power source, as desired.

FIG. 2 shows a schematic circuit diagram, 60, of an embodiment of the jobsite security system, 20, herein. Specifically, the wireless communications node, 22, sends a wireless signal, 62, such as an unlocking signal, a locking signal, another signal, or a combination thereof, to the wireless transceiver, 42, which is operatively-connected to the controller, 64. The controller, 64, then may, for example, switch the tool, 32, from the locked state to the unlocked state, from the unlocked state to the locked state, and/or perform a function, such as transmitting the tool's status information. Of course, a plurality of tools and wireless communication nodes may also be present, as well as, for example, one or more mobile devices (see FIG. 1 at 40).

In an embodiment herein, the controller, 64, is operatively-connected to the battery, 66, of the tool, 32, and may regulate the power output of the battery, 66, to the tool, via, for example, adjusting the speed of a motor, 68. In an embodiment herein, when the tool is in the locked state, the controller, 64, prevents electric current from flowing from the battery, 66, to the motor, 68. In an embodiment herein, when the tool, 32, is in the unlocked state, the controller, 64, allows electric current to flow from the battery, 66, to the motor, 68.

In an embodiment herein, the controller is operatively-connected to a memory module, 70, which stores data relating to the tool, 32, (the battery, 66, the charger (see FIG. 4 at 76), and/or etc.), such as, for example, the status history, the usage history, the charge history, the location history, the firmware history, the battery usage history, the authorized batteries, and a combination thereof; or the usage history, the charge history, the battery usage history, the authorized batteries, and a combination thereof. In an embodiment the usage history includes data such as, for example, the person(s) using the tool, the battery(ies) used with the tool, the location data, the communication node data, etc. and combinations thereof.

In the embodiment of FIG. 2 it can be seen that the wireless communication node, 22, the mobile device, 44, and/or the wireless transceiver, 42, in the tool, 32, may communicate either directly or indirectly with a cloud server, 72, thereby forming a mesh network; or a full mesh network. Thus, in an embodiment herein, the wireless communication node, the wireless transceiver, the wireless receiver, the wireless transmitter, and/or the mobile device may communicate with a cloud server. In an embodiment herein, the wireless communication node, the wireless transceiver, the wireless receiver, the wireless transmitter, the mobile device and/or the cloud server may send and/or receive; or send and receive a wireless signal.

Figure 3:
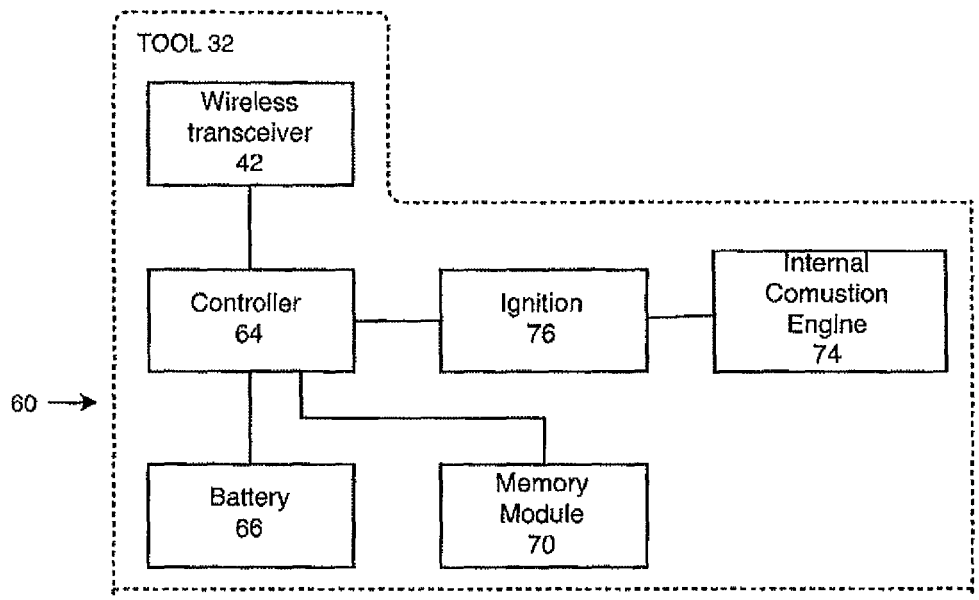
FIG. 3 shows a schematic circuit diagram of an embodiment of a tool.

FIG. 3, shows a schematic circuit diagram, 60, of an embodiment of a tool, 32, herein. In this embodiment, the tool, 32, is powered by an internal combustion engine, 74. Accordingly, in an embodiment herein where the tool, 32, contains an internal combustion engine, 74, then when the tool is in the locked state, the controller, 64, prevents electric current from flowing from the battery, 66, to the ignition, 76, of the internal combustion engine, 74. Alternatively, the controller may provide the locked state in an equivalent manner, such as, for example, preventing electric current from flowing from the battery to the spark plug (not shown) of the internal combustion engine, by constraining the fuel of the internal combustion engine, etc. In an embodiment herein, when the tool is in the unlocked state, the controller, 64, allows electric current to flow from the battery, 66, to the motor, 68.

As in FIG. 2, the controller, 64, is also operatively-connected to the wireless transceiver, 42, and the memory module, 70, of the tool, 32.

Figure 4:
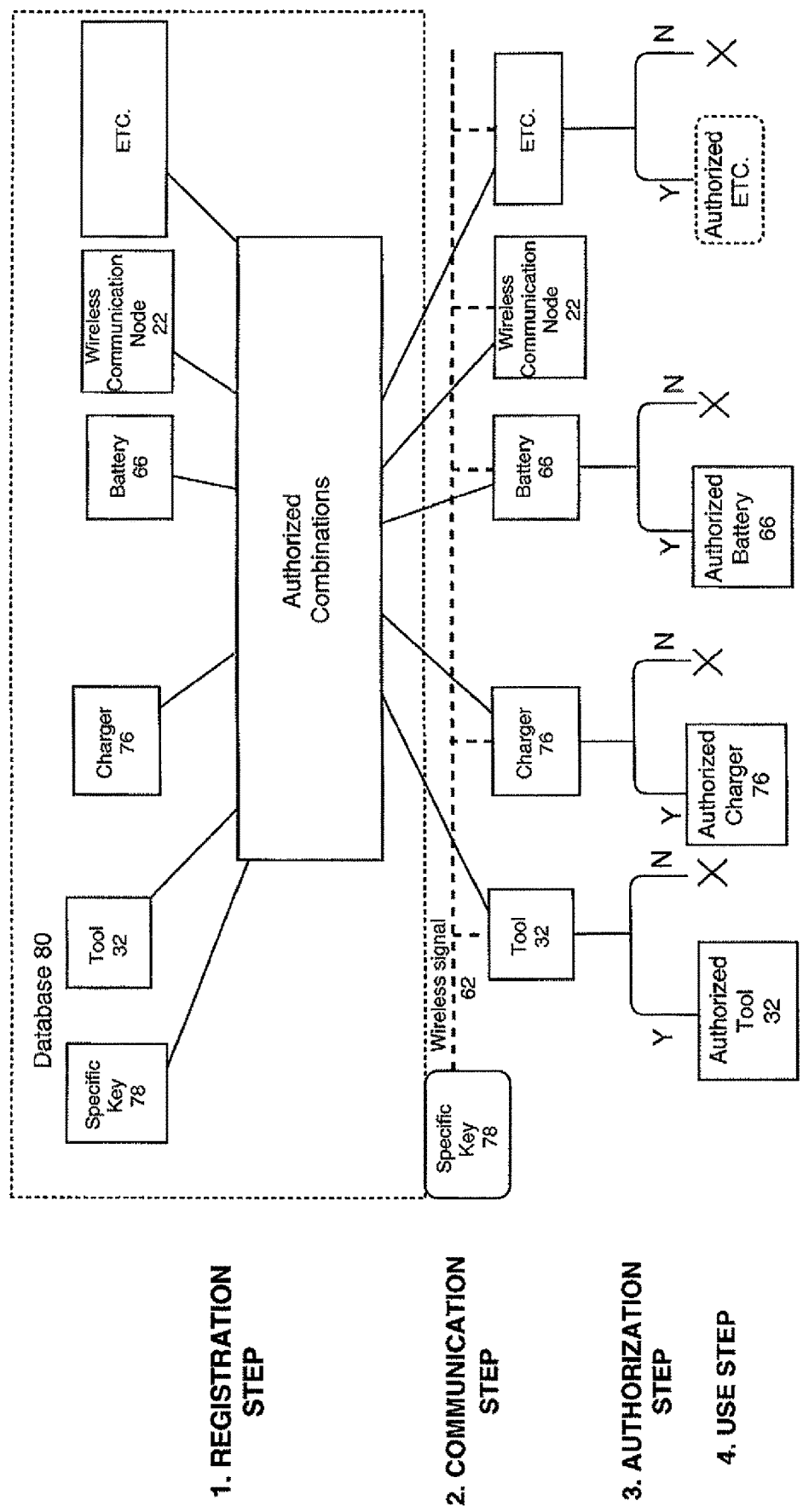
FIG. 4 shows a schematic diagram of an embodiment of the present invention having the added security feature where a tool, charger, and/or battery is only authorized to work under a specific condition(s)

FIG. 4 shows a schematic diagram of an embodiment of the present invention having the added security feature where a tool, 32, charger, 76, and/or battery is only authorized to work under a specific condition(s). This may be achieved by providing specific firmware to the controller, 64, which only allows the tool, 32, and/or the charger, 76, to operate when a specific battery, 66, and/or batteries, are connected thereto. Thus, the specific tool, 32, charger, 76, battery, 66, and/or etc. may be in a locked state unless it is attached to an authorized, complementary tool, 32, charger, 76, battery, 66, and/or etc.

In another embodiment also shown in FIG. 4, a specific key, 78, for each tool, 32, charger, 76, battery, 66, etc. may be provided which provides a signal; or in FIG. 4 an optional wireless signal, 62; or an unlocking signal, to the tool, 32, charger, 76, battery, 66, etc. In another embodiment the signal in FIG. 4 may be a wired signal. The special key herein may be, for example, a physical device, a software key, a firmware update, etc. and may be physically-provided, wirelessly-provided, etc. as desired. If the specific key is a software key, then the software key may be contained in, for example, a mobile device, a cloud server, 72, etc. as desired.

More specifically, in a registration step, the tool, 32, charger, 76, battery, 66, communications node, 22, and/or etc. are registered in a database, 80, typically by the user and/or the owner. The user and/or owner may instruct the database, 80, as to under what conditions the tool, 32, charger, 76, battery, 66, communications node, 22, and/or etc. may be used. The user and/or owner therefore defines the authorized combinations of tool, 32, charger, 76, battery, 66, communications node, 22, and/or etc. Since the communications node, 22, may be at a specific location, the user/owner may designate a specific tool, 32, charger, 76, battery, 66, and/or etc. to be only able to be activated/used in a specific location (i.e., provide a specific condition that it be within range of an identified communication node, 22) at a site. Alternatively, if other geo-location data, such as GPS data, cell tower data, etc. is available, then the user/owner may use such data to designate that the specific tool, 32, charger, 76, battery, 66, etc. only be able to be activated/used in a specific location(s). The database, 80, then stores, and/or organizes the permutations of the authorized combinations.

In a communication step, the database, 80, communicates the authorized combinations (i.e., the conditions) to the tool, 32, charger, 76, battery, 66, communications node, 22, and/or etc.; or the controller (see FIG. 2 at 64) of the tool, 32, charger, 76, battery, 66, communications node, 22, and/or etc., via a signal; or a wireless signal. In practice, this communication step may occur via, for example, instructions to the controller (see FIG. 2 at 64), a firmware update, etc.

The authorization step checks to see whether or not the conditions, as set in the database as the authorized combinations, are met. Typically the controller (see FIG. 2 at 64) checks to see whether the conditions are met, given the data available to the controller. If the conditions are met, then the controller will change the tool, 32, charger, 76, battery, 66, and/or etc., from the locked state to the unlocked state. If the conditions are not met, then the controller (see FIG. 2 at 64), will maintain the tool, 32, charger, 76, battery, 66, and/or etc., in the locked state. Alternatively, if the conditions are not met, then the controller (see FIG. 2 at 64), may change the tool, 32, charger, 76, battery, 66, and/or etc., from the unlocked state into the locked state. The use step occurs when all of the conditions are met and the user actually uses the (authorized) tool, 32, charger, 76, battery, 66, and/or etc.

For example, if an authorized combination is the use of saw #3 with battery #1 at communications node #4 which is located at the woods in FIG. 1, then the saw's controller (see FIG. 2 at 64, will check to see whether or not battery #1 is connected, and whether or not the saw is within range of communications node #4. If these conditions are met, then the controller will change the saw into the unlocked state which will allow a user to activate the saw. However, if saw

3 is connected to battery #2, and/or is not within range of communications node #4, then the controller will not change the saw into the unlocked state and it will be unusable.

Without intending to be limited by theory, it is believed that such an optional feature further reduces the incentive for the theft of tools, batteries, chargers, etc.

In an optional embodiment herein the user/owner may authorize different batteries, 66, 66', 66", etc., to work with specific tools, 32, and/or chargers, 76. In an embodiment herein, the user/owner may provide the authorization via, for example, a mobile device (see FIG. 1 at 44), a cloud server (see FIG. 2 at 72), a signal, a wireless signal, 62, etc. Thus, in an embodiment herein, the authorization step includes the step of having the specific key, 78, provide a signal; or a wireless signal, 62; or an unlocking signal, to the tool, 32, charger, 76, battery, 66, communications node, 22, and/or etc.

In an embodiment herein, the controller in the tool and/or the charger determines whether the respective tool or charger is in the locked state or the unlocked state; when an authorized battery is inserted into the tool and/or the charger, then the respective controller may change the tool and/or charger to the unlocked state. In an embodiment herein, the controller requires both an unlocking signal and an authorized battery in order to change a tool and/or a charger from the locked state into the unlocked state.

Figure 5:
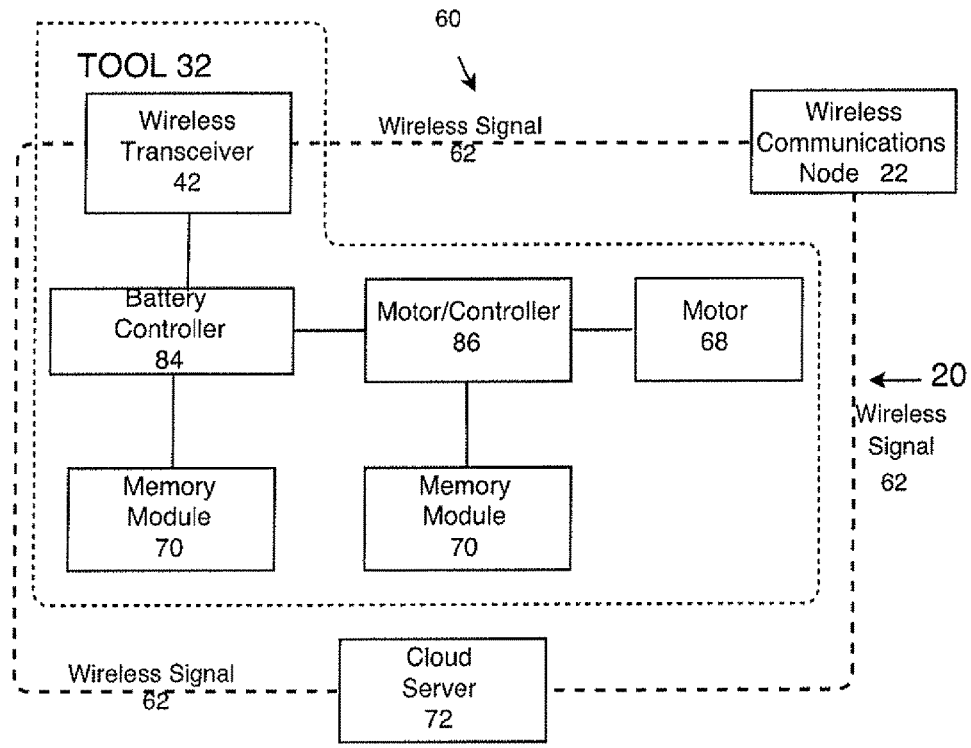
FIG. 5 shows a schematic circuit diagram of an embodiment of the jobsite security system.

FIG. 5 shows a schematic circuit diagram, 60, of an embodiment of the jobsite security system, 20, herein. Specifically, the wireless communications node, 22, sends a wireless signal, 62, such as an unlocking signal, a locking signal, another signal, or a combination thereof, to the wireless transceiver, 42, which is operatively-connected to the battery controller, 84. The wireless signal, 62, may be sent directly to the wireless transceiver, 42, or via, for example, a could server, 72. The battery controller, 84, then may, for example, switch the tool, 32, from the locked state to the unlocked state, from the unlocked state to the locked state, and/or perform a function, such as transmitting the tool's status information. Of course, a plurality of tools and wireless communication nodes may also be present, as well as, for example, one or more mobile devices (see FIG. 1 at 40).

In the embodiment of FIG. 5, the battery controller, 84, is operatively-connected to a memory module, 70 that stores data relating to, for example, the usage history, tool use, tool history, the authorized tools, battery usage history, charge history, the authorized batteries, and a combination thereof. In addition, the battery controller, 84, is operatively-connected to the motor controller, 86, that controls the motor, 68. The motor controller, 86, is further operatively-connected to a memory module, 70, which stores data pertaining to the motor controller, the usage history, the motor use, tool use, tool history, battery history, the authorized batteries, and a combination thereof. In an embodiment herein, when the tool is in the locked state, the motor controller, 86, prevents electric current from flowing to the motor, 68. In an embodiment herein, when the tool, 32, is in the unlocked state, the motor controller, 86, allows electric current to flow to the motor, 68. In an embodiment the usage history includes data such as, for example, the person(s) using the tool, the battery(ies) used with the tool, the location data, the communication node data, etc. and combinations thereof.

In the embodiment of FIG. 2 it can be seen that the wireless communication node, 22, the mobile device, 44, and/or the wireless transceiver, 42, in the tool, 32, may communicate either directly or indirectly with a cloud server, 72, thereby forming a mesh network; or a full mesh network. Thus, in an embodiment herein, the wireless communication node, the wireless transceiver, the wireless receiver, the wireless transmitter, and/or the mobile device may communicate with a cloud server. In an embodiment herein, the wireless communication node, the wireless transceiver, the wireless receiver, the wireless transmitter, the mobile device and/or the cloud server may send and/or receive; or send and receive a wireless signal.

Figure 6:
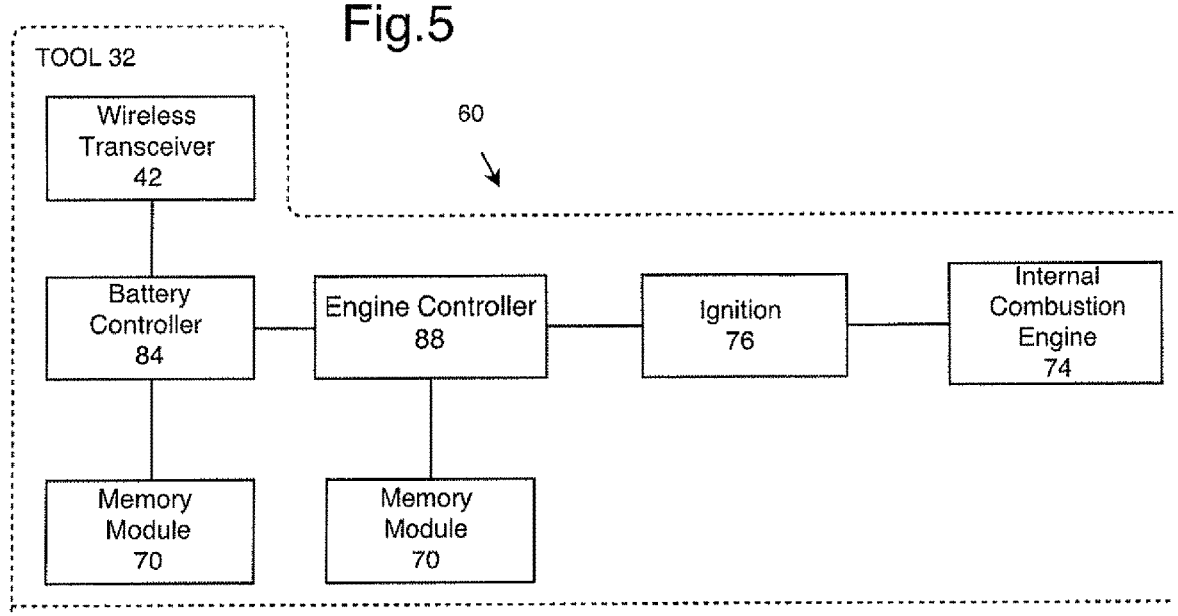
FIG. 6 shows a schematic circuit diagram of an embodiment of a tool.

FIG. 6, shows a schematic circuit diagram, 60, of an embodiment of a tool, 32, herein. In this embodiment, the tool, 32, is powered by an internal combustion engine, 74. In this embodiment the tool, 32, contains a battery controller, 84, operatively-connected to the wireless transceiver, 42, a memory module, 70 that stores data relating to, for example, the usage history, tool use, tool history, the authorized tools, battery usage history, charge history, the authorized batteries, and a combination thereof.

In addition, the battery controller, 84, is operatively-connected to the engine controller, 88, that is operatively-connected to and controls all aspects of an internal combustion engine, 74, including the ignition, 76. The engine controller, 88, is also operatively-connected to a memory module, 70, which stores data relating to, for example, the usage history, tool use, tool history, the authorized batteries, fuel consumption, power usage, and a combination thereof.

Method of Use

An embodiment of the invention herein includes a method for securing a job site having the steps of providing a wireless communications node having a wireless transmitter, and providing a plurality of tools where each tool has a controller operatively-connected to a wireless receiver. Each tool has a locked state and an unlocked state as determined by the controller, and (initially) the tool is in the locked state. The method further has the steps of transmitting an unlocking signal from the wireless transmitter, receiving the wireless signal with the wireless receiver, and unlocking the tool with the controller. The method may provide from about 1 to about 32768 wireless communication nodes; or from about 1 to about 10000 wireless communication nodes; or from about 1 to about 1000 wireless communication nodes; or from about 1 to about 20 wireless communication nodes; or from about 2 to about 15 wireless communication nodes.

In an embodiment of the present invention, the method further contains the steps of locking the tool within a predetermined period of time; or within about 24 hours; or within about 12 hours; or within about 10 hours; or within about 6 hours, of receiving the unlocking signal; or of unlocking the tool by initiating the unlocked state. In an embodiment herein, the controller initiates the locking step changing the tool from the unlocked state to the locked state.

As noted above, the wireless signals may be sent indirectly or directly, and therefore in the cases where the wireless communication node, a wireless transmitter, a wireless receiver and/or a wireless transceiver is connected to the internet, to a cloud server, etc., then in an embodiment herein, the method herein further contains the steps of sending a wireless signal to a cloud server, and sending a wireless signal from the cloud server to a wireless receiver; or a wireless transceiver.

In an embodiment herein, where the tool contains upgradable firmware, or where the wireless signal contains a firmware update, then the method herein may further contain the step of upgrading the upgradable firmware.

Furthermore, it is recognized that where the tool contains a transceiver, that the tool may further take the step of sending a wireless signal to the communications node, directly or indirectly.

The method herein may further contain the steps of transmitting a locking signal from the transmitter to the wireless receiver, optionally transmitting the locking signal to the controller, and then locking the tool via instructions from the controller.

In an embodiment of the method herein, in a delegation step, the user may further delegate a tool, charger, battery, mobile device, communication node, and/or combination thereof to be able to send a wireless signal; or a unlocking signal and/or a locking signal; or a locking signal; or an unlocking signal, to the job site security system. In an embodiment herein, the delegating step occurs via a graphical user interface on a communication node, a mobile device and/or a computer.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable subcombination.

The invention claimed is:

1. A job site security system comprising:
at least one device, the at least one device being one of a power tool, a battery pack, or a charger, the at least one device including a first controller operatively-connected to a first wireless transceiver; and
a lockable storage unit including a wireless communication node, the wireless communication node including a second controller and a second wireless transceiver, the second controller configured to:
determine whether the at least one device is located within the lockable storage unit at a time of day defined by a user of the lockable storage unit; and
provide an alert indicating the at least one device is not located within the lockable storage unit at the time of day defined by the user of the lockable storage unit.

2. The job site security system of claim 1, wherein the alert is one selected from the group consisting of an audible alarm, a visible alarm, and a notification provided to a mobile device.

3. The job site security system of claim 1, wherein the controller is further configured to determine a signal strength of a wireless signal received from the at least one device is below a threshold to determine whether the at least one device is located within the lockable storage unit.

4. The job site security system of claim 3, wherein the threshold is set by a user of the lockable storage unit.

5. The job site security system of claim 3, wherein the threshold is approximately −50 decibels.

6. The job site security system of claim 1, further comprising:
an electronic lock configured to receive a signal to lock a cover of the lockable storage unit.

7. The job site security system of claim 1, wherein the second controller is further configured to transmit, if the at least one device is not located within the lockable storage unit, using the second wireless transceiver, a locking signal to the first wireless transceiver of the at least one device.

8. The job site security system of claim 1, wherein the lockable storage unit is a tool box.

9. A lockable storage unit for storing a plurality of power tools, the lockable storage unit comprising:
a wireless communication node including a wireless transceiver; and
a controller configured to:
determine the end of a working period; and
transmit, upon determining the end of the working period, using the wireless transceiver, a report to a mobile device, the report including at least one of a battery status of at least one of the plurality of power tools or a wear status of the at least one of the plurality of power tools.

10. The lockable storage unit of claim 9, wherein the report further includes at least one selected from the group consisting of a presence of the at least one of the plurality of power tools, a needed repair of the at least one of the plurality of power tools, and a damage to the at least one of the plurality of power tools.

11. The lockable storage unit of claim 9, wherein the controller is further configured to:
maintain a data log for tracking which of the plurality of power tools are checked out and where each of the plurality of power tools is located,
wherein the data log is included in the report.

12. The lockable storage unit of claim 9, wherein the lockable storage unit is a tool box.

13. The lockable storage unit of claim 9, wherein the controller is further configured to:
determine whether at least one of the plurality of power tools is located within the lockable storage unit by comparing a signal strength of a wireless signal received from the at least one of the plurality of power tools to a threshold; and
transmit, in response to determining the at least one of the plurality of power tools is not located within the lockable storage unit, a locking signal to the at least one of the plurality of power tools.

14. The lockable storage unit of claim 13, wherein the controller is further configured to provide, in response to determining the at least one of the plurality of power tools is not located within the lockable storage unit, an alert indicative of the at least one of the plurality of power tools not being located within the lockable storage unit.

15. A job site security system comprising:
a wireless communication node;
at least one device, the at least one device being one of a power tool, a battery pack, or a charger, the at least one device including a first controller operatively-connected to a first wireless transceiver;
a mobile device operatively-connected to the wireless communication node, the mobile device including a second controller operatively-connected to a second wireless transceiver; and
a lockable storage unit configured to store the at least one device, the lockable storage unit including a third controller,
wherein the second controller is configured to:
receive, from the first wireless transceiver, a status of the at least one device, the status including at least one of a battery status of the at least one device or a wear status of the at least one device, and
wherein the third controller is configured to:
determine whether the at least one device is located within the lockable storage unit at a time of day defined by an owner of the lockable storage unit.

16. The job site security system of claim 15, wherein the third controller is configured to:
   transmit, with the third wireless transceiver, a report to the mobile device, the report including at least the battery status of the at least one device and the wear status of the at least one device.

17. The job site security system of claim 15, wherein the status further includes at least one selected from the group consisting of a presence of the at least one device, a repair needed by the at least one device, and a damage to the at least one device.

* * * * *